United States Patent [19]
Warman et al.
[11] 3,814,990
[45] June 4, 1974

[54] ASSEMBLIES OF ELECTRICAL COMPONENTS

[75] Inventors: Bloomfield James Warman, Milan, Italy; Kenneth Frederick Elliott; Jack Frederick Kennard, Bexley, both of England

[73] Assignee: GTE International Incorporated, New York, N.Y.

[22] Filed: Dec. 21, 1972

[21] Appl. No.: 317,445

[30] Foreign Application Priority Data
Mar. 27, 1972 Great Britain .................... 14323/72

[52] U.S. Cl. .................................. 317/122, 179/98
[51] Int. Cl. ............................................ H02b 9/00
[58] Field of Search ........ 179/98; 317/122; 312/122

[56] References Cited
UNITED STATES PATENTS
2,471,970 5/1949 Miloche ............................. 179/98
FOREIGN PATENTS OR APPLICATIONS
1,160,025 12/1963 Germany ............................ 179/98

*Primary Examiner*—David Smith, Jr.
*Attorney, Agent, or Firm*—K. Mullerheim

[57] ABSTRACT

A component mounting and wiring arrangement which predominantly uses parts molded of plastic material and provides for modular mounting, and yet flexibility of connection, of largely standardized components, such as miniature multi-contact electromagnetic relays in automatic telephone exchanges. The components are carried on multi-socket mounting strips which, with their sides abutting each other, are insertable in, and fastened to, a frame which in turn is removably mounted, in drawer-like fashion, in a rack or cabinet. Between any two adjacent component mounting strips there is provided a conduit member which serves as a wiring channel for accommodating the wires employed in the point to point wiring of the components carried by the frame, and is designed to fan these connecting wires out at suitable points across the frame and bring these wires out beneath the components for connection to terminals depending therefrom. A generally U-shaped cover is snapped over the conduit member so as to hold the wires in place by clamping. Adapters are provided to permit the connecting wires to be terminated in printed circuit panels. Provisions are also made for mounting printed circuit boards on the frame, in addition to, and in parallel with, the multi-socket mounting strips.

14 Claims, 18 Drawing Figures

ASSEMBLIES OF ELECTRICAL COMPONENTS

This invention relates to the assembly of electrical components, and concerns more especially the mounting of components which are to be assembled into apparatus units of substantial size. The invention is particularly, although not exclusively, suited to the construction of apparatus which contains a large number of similar, or identical, components to be wired together in an intricate manner, and it is one object of the invention so to arrange an assembly of components that a substantial part of this wiring can be carried out by machine in a convenient manner.

For example, in the construction of apparatus such as an automatic telephone exchange incorporating relay switching, a substantial part of the physical size of the apparatus is taken up by banks of relays, all of which relays may be identical, the function to be performed by the apparatus being determined by the configuration in which the relays are to be wired. Where it is necessary to provide an exchange having a number of functionally different apparatus units, the different functions of which are determined primarily by the wiring configurations between relays, if a versatile wiring system can be incorporated, it will be possible to standardize the physical construction of the apparatus units and correspondingly to reduce production costs. It is thus a further object of the invention to provide a component mounting and wiring system that will enable an apparatus such as an automatic telephone exchange to be built up on a modular construction with the maximum possible standardization of components.

The present invention provides an assembly of electrical components comprising a frame defining two generally parallel longitudinally extending bearers, a plurality of mounting strips secured at their opposite ends to said bearers respectively and extending transversely between said bearers in parallel spaced apart relation, each mounting strip carrying a row of electrical components spaced along its length and having, at each of two opposite edges spaced apart in a plane generally parallel to the plane containing said bearers, a row of terminals connected to said components, and there being provided between each adjacent pair of mounting strips a conduit member defining a channel or passage for connecting wires, said passage extending between said bearers substantially parallel to said mounting strips and having adjacent each of said mounting strips a row of regularly spaced locating means for the ends of connecting wires, the terminals of said mounting strips being correspondingly positioned to register with said locating means of the conduit members.

Advantageously portions of the adjacent mounting strips abut together at the ends secured to said bearers, the abutting portions defining a mounting for engagement by a correspondingly shaped portion of the intermediate conduit member, and the interengagement of the conduit member and the mounting strips serving to position the said locating means of the former in register with the terminals of the latter.

According to one embodiment of the invention the said locating means of each conduit member may comprise rows of outlets in each of two opposite walls of the conduit member defining said channel or passage, and, in the exterior of said walls adjacent said rows of outlets, a correspondingly arranged regularly spaced series of recesses extending generally perpendicular to the plane containing said bearers, the arrangement being such that the ends of connecting wires issuing from said outlets extend along said recesses and into engagement with corresponding terminals of said mounting strips.

According to a particularly advantageous construction of conduit member, the body of the conduit member comprises an open-topped channel member, the interior of the channel defining the passage for the connecting wires, the base of the channel being adapted at each end of the member to be secured to the adjacent mounting strips, and the side walls of the channel having a series of vertical slots whereby they are each in the form of a fence of uniformly spaced pales which are integral with and extend from the base of the channel. The slots in the side walls thus define the outlets from the conduit member, and after insertion of the connecting wires into the channel member and through the slots, the open top of the channel member may be closed, for example by a lid of U-shaped channel section over-lying the open top and the side walls of the channel member. This arrangement is eminently suitable for wiring up of the conduit member by means of an automatic wiring machine since easy access to the conduit member and its outlets is provided to the machine, and moreover, after wiring up of the conduit member the addition of a lid will serve to secure the loose ends of connecting wires in place, so that the conduit member can be stored ready wired up for subsequent assembly into a complete apparatus unit.

Preferably the channel member forming a conduit member is of generally H-shaped cross-section with the upper limbs of the H being of greater length and comprising the slotted side walls defining between them the passage for wires and the lower limbs of the H being of shorter length and having in their outer surfaces the said recesses for receiving the ends of connecting wires. Thus the ends of wires passed through the slots in the upper limbs of the H are angled downwardly into the recesses defined by the lower limbs of the H and are held in place by the U-shaped channel member arranged over the upper part of the conduit member to form a lid, the lower portions of the lower limbs of the H-shaped conduit member remaining free to cooperate with the terminals of the said mounting strips.

According to a further embodiment of the invention, an assembly as defined above further includes, in addition to components mounted on said mounting strips, components mounted on one or more circuit boards. In order to enable the circuit boards also to be connected to wires carried by a conduit member there is in this case provided for each circuit board one or more adaptor members arranged to receive and locate the edge of a circuit board and to be secured to a conduit member. For this purpose at least one H-shaped conduit member may be provided with mounting bosses on the underside of the crosspiece of the H, and the lower limbs of the H may be recessed in the region of the mounting bosses so that laterally extending tongues of an adaptor member can pass through the recesses to engage the mounting bosses. The adaptor member is advantageously shaped to locate the circuit board with its plane parallel to the plane of the bearer members and an edge parallel to the conduit member, and preferably has transverse surface grooves in which connecting wires can be led from the outlets of the conduit member to corresponding terminals at the edge of the circuit board, the mounting tongues of the adapter member and the mounting bosses of the conduit member cooperating to locate the grooves in register with said outlets.

When such a circuit board is located adjacent a conduit member, in order to provide for mounting of the ends of the conduit member, brackets having a configuration similar to the ends of said mounting strips are secured to the bearers in order to provide the necessary mounting points. The brackets may also be adapted to receive the ends of a circuit board, and where the latter is of substantial length a number of brackets may be spaced along the bearers to receive the edges of the circuit board. If necessary, the brackets may be located at the appropriate spacing by spacer members inserted between them.

By means of such adaptors, and if necessary the mounting brackets secured to the bearers, a circuit board can be connected between adjacent conduit members, or can be arranged at one end of the mounting frame of the assembly in connection with a single conduit member. Such a circuit board may serve to provide terminal connections between an assembly according to the invention and associated electrical apparatus.

According to one embodiment of the invention, the said bearers are of C-shaped channel cross-section, and the ends of said mounting strips together with said brackets and any associated spacers are of T-shaped cross-section so that the crosspiece of the T can make sliding engagement in the C-shaped channel. This enables the assembly to be built up in a simple manner, by securing the two bearers together by a frame cross member at one end, and then sliding the mounting strips, brackets and any spacers from the open end of the frame into the channels provided by the bearers. The mounting frame can then be completed by a further cross member secured across the free ends of the bearers, and advantageously the section of the bearers is such as to provide apertures to receive self-tapping screws for this purpose. The section of the bearers may further be such as to provide for sliding engagement of their outer edges with runners of a cabinet, so that a plurality of said mounting frames may be arranged in a cabinet above one another in the manner of the drawers of a filing cabinet. The respective electrical assemblies may then be connected together by leads secured to terminals of a circuit board provided in the assembly.

The said mounting strips may be of any desired form to receive the appropriate electrical components. According to one particularly advantageous embodiment of the invention, however, the mounting strips may provide a plurality of sockets for standard relays and may incorporate the appropriate electrical connections between the terminals of the relays and the abovementioned terminals of the mounting strips.

The invention is illustrated by way of example in the accompanying drawings, in which.

Figure 1:
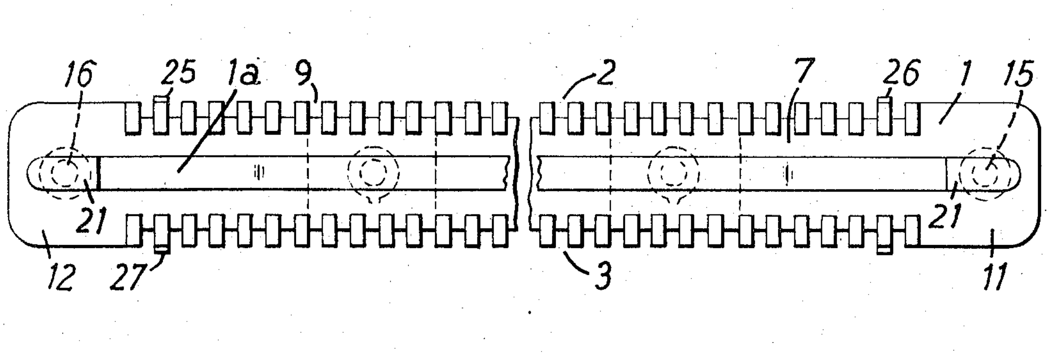
FIGS. 1, 2 and 3 show plan and elevation views of the two ends only of a conduit member adapted to facilitate the point-to-point wiring of frame mounted electrical components.
Figure 2:
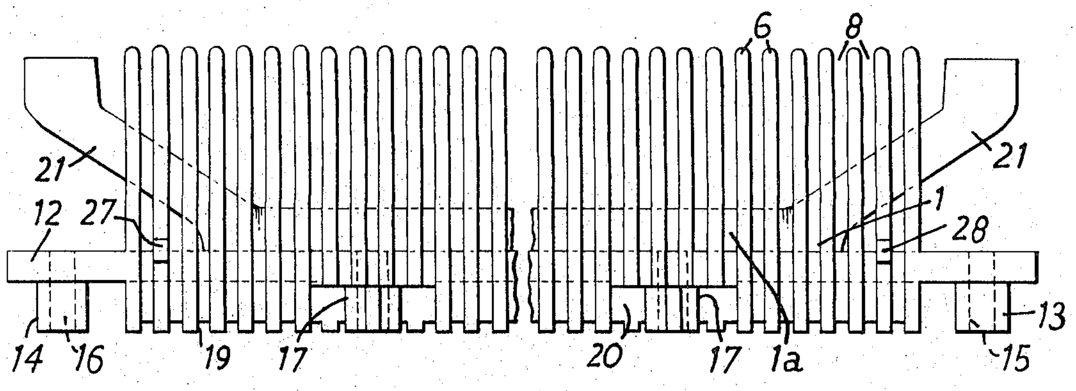
Figure 3:
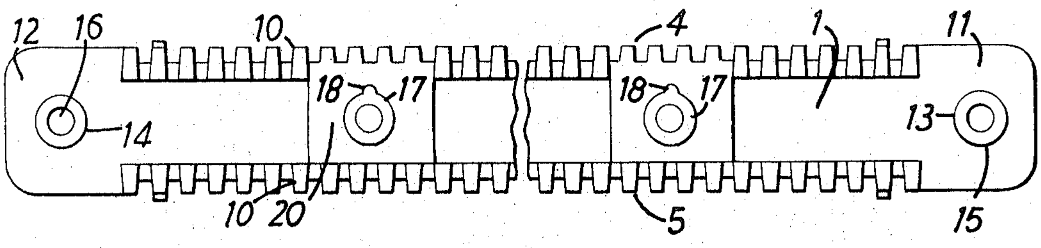
Figure 4:
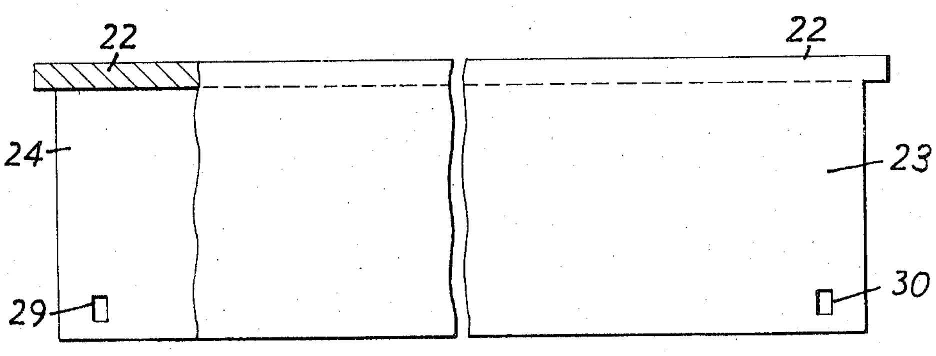
FIG. 4 shows in part section the form of a cover member suitable for use with the conduit of FIGS. 1, 2 and 3.

Referring now to FIGS. 1–4, the conduit member there shown is adapted to mount transversely of a rectangular apparatus mounting frame and serves not only as a wiring channel for accommodating wires employed in the point-to-point wiring of the apparatus carried by the mounting frame but also serves as a means for fanning these connecting wires out at suitable points across the frame and for enabling the fanned out wires to be brought out beneath the apparatus for connection to terminal members depending therefrom. A number of these wiring conduits may be provided and located at spaced intervals along the length of the apparatus mounting frame. The figures show the two ends only of a conduit member which may be of any desired length, the central part, not shown, being a continuation of the end parts shown. The conduit member is in two parts, one part, shown in FIGS. 1–3, being the combined wire chanelling and fanning strip part, while the other part shown in FIG. 4, is a cover part intended for use as required and whose function is described later, below. With regard to the combined wire channelling and fanning strip part shown in FIGS. 1–3, FIG. 2 is a side elevation while FIGS. 1 and 3 are plan views drawn respectively from above and below FIG. 2. In end view, the part has the general form of a letter H, but with the transverse bar of the letter set somewhat below its horizontal center line, as can be seen from FIG. 2. The part is a single moulding of suitable plastics material such as glass filled polycarbonate and comprises a horizontal platform 1 from edge regions of which upper and lower side walls 2, 3 and 4, 5 extend, the height of the upper side walls 2, 3, being about two and a half times the depth of the lower side walls 4, 5. Each of the upper side walls takes the form of a fence of uniformly spaced pales 6, which are integral with and extend from the upper surface of the platform part 1, the spacing of the pales 6 being such as to allow connecting wires located within the wiring channel 7, formed between the upper side walls 2 and 3 to be fanned out through appropriate ones of the spaces 8 between pairs of the pales 6. The sides of the platform part 1, have a toothed configuration, as indicated at 9, the depth of the teeth being approximately half the thickness of the walls and the individual teeth being aligned with the individual pales forming the side walls 2 and 3. The lower side walls 4, 5 are an extension of this toothed configuration below the lower surface of the platform part 1. In plan view therefore, the lower side walls 4, 5 have the form of a toothed rack as shown at 10, FIG. 3. The lower edges of the walls 4, 5 are also castellated as shown in FIG. 2, to provide recesses 19 at said lower edges, which form continuations of the recesses defined by the toothed rack 10, for the purpose to be described in more detail below. The platform part 1 has end extremeties 11, 12, by means of which the conduit member can be supported in transverse relationship to a rectangular frame. To this end, the end extremities are formed with cored bosses 13, 14, which serve for the accurate location of the conduit member and enable it to be secured in position by means of self-tapping screws or the like screwed into the bores 15 and 16. In the case of at least one conduit member of the mounting frame, there are provided between the end extremities and at spaced intervals along its length, two or more further cored bosses 17 also depending from the platform 1. These bosses each have a vertical locating rib 18, which projects from one side of each boss along a diameter which is transverse to the platform part. Also, the lower wall 4 has recesses 20, adjacent these bosses, to give access to the bosses when required. These bosses 17 and the recesses 20 provide for the attachement of an adapter member on one side of the conduit member, as described later below with reference to the adapter member shown in FIGS. 9–11 inclusive. Although the recesses 20 and locating ribs 18 are only provided on one side of the conduit member and bosses 17 in the example illustrated, when adapter members are to be provided at both sides of a conduit member both walls 4 and 5 may have such recesses, in which case the locating ribs 18 will likewise be provided on both sides of the bosses 17. In the case of a conduit member which is not to be assembled with an adapter member, the bosses 17, ribs 18 and recesses 20 will be omitted altogether. As can be seen from FIGS. 1 and 2, the platform 1 of the conduit member has on its upper side between the walls 2 and 3 a reinforcing rib 1*a* which serves to reduce the tendency of the conduit member to bow as a result of tension placed upon connecting wires located within the channel 7 and passing between the pales 6. In order to further reduce this tendency, there are provided, towards the ends of the channel 7, posts 21 which extend upwardly from the platform 1 and are inclined towards the ends of the channel 7. When connecting wires in the channel 7 are fanned out between pales 6 towards the ends of the channel the wires are looped around the posts 21, and as a result of the shape of the latter the wires are urged towards the base of the channel 7 and the forces placed on the pales 6, as a result of tension in the connecting wires, are reduced. The cover part shown in FIG. 4 has an open ended channel form and is also a one piece moulding of polycarbonate or like plastics material. It has a flat top 22, from which side walls 23, 24 depend, and its dimensions are such that, when in position the side walls 23, 24, are a close fit over the upper side walls 2, 3 of the channel part, so that the flat top part 22 encloses the gap between the upper side walls. Also, the side walls 23 and 24 of the cover extend both over the side walls 2 and 3 of the channel part and over the sides of the platform part 1 and is secured in position by the engagement of ribs 25, 26, 27, 28, which project from the root parts of spaced ones of the pales 6 and correspondingly located indentations 29, 30, formed on the inside surfaces of the cover part side walls. In use, the combined channel and fanning strip parts to be used may be secured in position on a frame and the point-to-point wiring installed, within the channels and with the terminal ends of the wiring fanned out between appropriate pairs of the pales 6, and formed downwardly so as to lie within the troughs between corresponding pairs of teeth in the lower side walls 4 and 5. The cover part is then clipped into position over the side walls 2 and 3, so that cover side walls at their lower edges effectively trap the terminal wires within their respective troughs and hence prevent these being inadvertently displaced during subsequent wiring or connecting operations.

Figure 5:
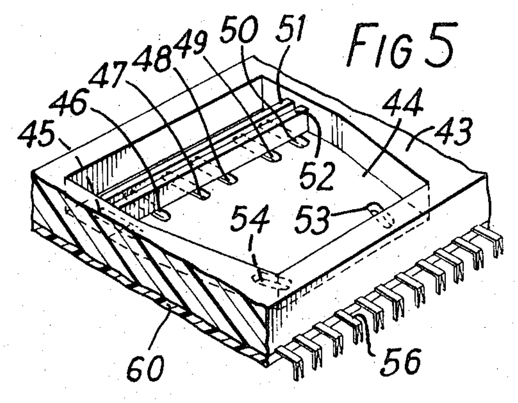
FIGS. 5 and 6 show three dimensional representations of a multi-outlet socket member capable of serving as an end cap for a relay or like component module and forming part of a mounting strip suitable for use with the conduit of FIGS. 1, 2, 3 and 4.
Figure 6:
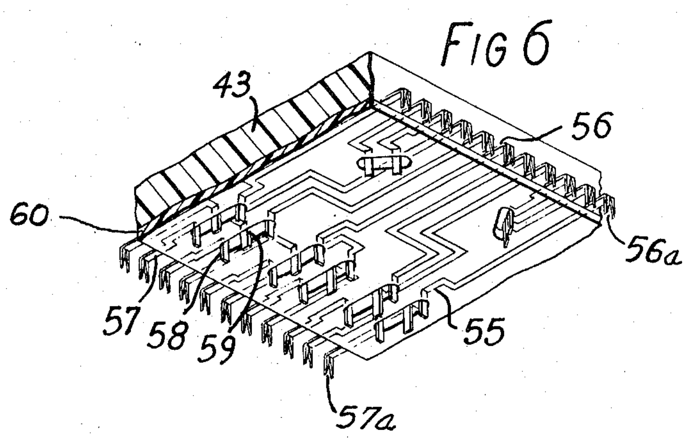
Figure 12:
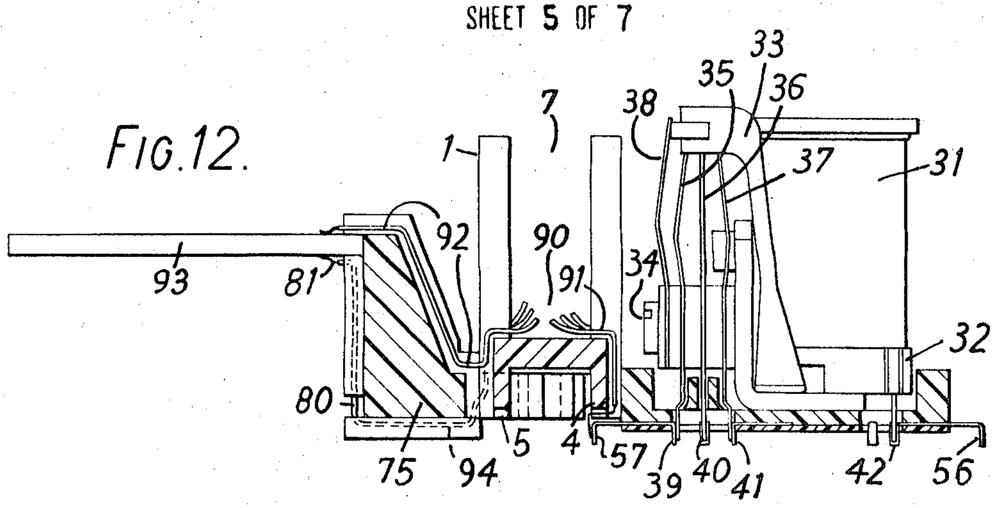
FIG. 12 shows, in section, a typical assembly of the members shown in FIGS. 1–11.

Turning now to FIGS. 5 and 6, the multi-way socket member there shown is adapted for use with a well known form of miniature multi-contact electromagnetic relay. A pictorial representation of such a relay is shown in FIG. 12, but as this relay is well known, only those details of its construction which are relevant to this invention will be described. Viewing the relay as in FIG. 12, it comprises a coil winding 31, two coil tag blocks; only one of which, designated 32, is seen in the drawing, the other being correspondingly located behind the coil winding 31, two Z shaped contact operating levers of which only one, designated 33 is seen in the drawing, and a contact spring set 34. The contact spring set 34 is secured across the front of the relay and provides six change-over contact elements, the contact carrying springs 35, 36, 37 of one of these contact elements being visible in the drawing. The spring set assembly also carries a phosphor bronze restoring spring 38. Each change-over contact element provides a row of three terminal pins those visible at 39, 40 and 41 being extensions of the contact springs 35, 36 and 37. These terminal pins extend downwardly from the lower face of the spring set assembly, the two outer terminal pins 39 and 41 being offset with respect to the center pin 40 thereby increasing the spacing between the terminal ends of these pins. Similarly the coin terminal blocks 32, also each provide one or two, terminal pins such as 42, depending upon whether a single or two winding coil is provided, which extend downwardly from the respective terminal block.

The socket member shown in FIGS. 5 and 6 is adapted for use with the relay above described and has a body part 43 of moulded plastics material such as glass filled polycarbonate, which forms part of a plank part 61 of a complete mounting strip as described below (see FIGS. 7 and 8). FIG. 5 is a view looking towards the upper surface, while FIG. 6 is a view looking towards the under surface of the block. Referring to FIG. 5, the upper face of the socket member 43 has a recess 44 into which the rear end of the relay can be inserted. The recess being shaped to conform generally to the rear end face of the relay, that is, it has a rectangular frontal portion which accommodates the lower part of the relay spring set and a portion which tapers towards the rear of the recess and which conforms generally to the shape of the end face of the relay coil and tag blocks. In the base of the rectangular portion of the recess 44, six elongate apertures designated 45–50 inclusive are formed in positions corresponding to the respective ones of the six groups of terminal pins which extend from the relay spring set assembly. Across these apertures, two shaped rib members 51 and 52 are formed and are located in spaced relationship so that each elongate aperture is divided into three substantially equal portions, through which the respective ones of the three terminal pins extended from a change over contact element of the spring set can pass. The ribs 51 and 52 have their outwardly facing surfaces shaped to conform to the offset portions of the outer ones of the group of three contact pins. These ribs thus serve to isolate the three terminal pins of a changeover contact element electrically and also serve to strengthen the moulding in the region of these apertures. Towards the tapered end of the recess, two further elongated apertures 53, 54, are formed and positioned to accommodate the terminal pins extended from the relay coil terminal blocks. The rear face of the socket, shown in FIG. 6, has a set of flat conductor elements 55 inlaid into the rear surface. Each of these conductor elements extends from a position adjacent a respective one of the relay terminal pins to a position slightly proud of either the forward or rear edge of the socket moulding. The relay presents a total of 22 terminal pins which extend through the respective apertures in the socket base and, corresponding to these, there are a total of 22 flat conductor elements in a set, the conductors being formed so that each follows a predetermined inlay path, from a tag such as 58, 59 contacting a relay terminal pin, over the rear face of the moulding. Eleven of these conductor elements have portions 56 extending to positions proud of the forward edge of the moulding while the remaining eleven have portions 57 extending to positions proud of its rearward edge, to form contact tags. Each conductor element has a bifurcated portion 56*a*, 57*a* formed over at right angles so as to provide a locating means for a connecting wire, see below. Conveniently these conductor sets would be formed by stamping from sheet material and the relay pin connections would be secured thereto by wave soldering or the like. To retain and protect the conductor elements in their inlaid positions in the rear surface of the moulding a moulded cover plate 60 of suitable plastics material, not necessarily transparent, such as polycarbonate, and having apertures corresponding to the apertures in the socket moulding is cemented or welded in place over the rear face of the socket. The spacing of the contact tags 56, 57 which protrude from the forward and rear edges of the socket member is made to correspond to the spacing of the teeth formed in the conduit wall members 4 and 5, FIG. 3, and the width of the tags is such that they effectively bridge the recesses 19 formed by the castellations of the conduit members.

The assembly is described more fully with reference to FIG. 12 below.

Figure 7:
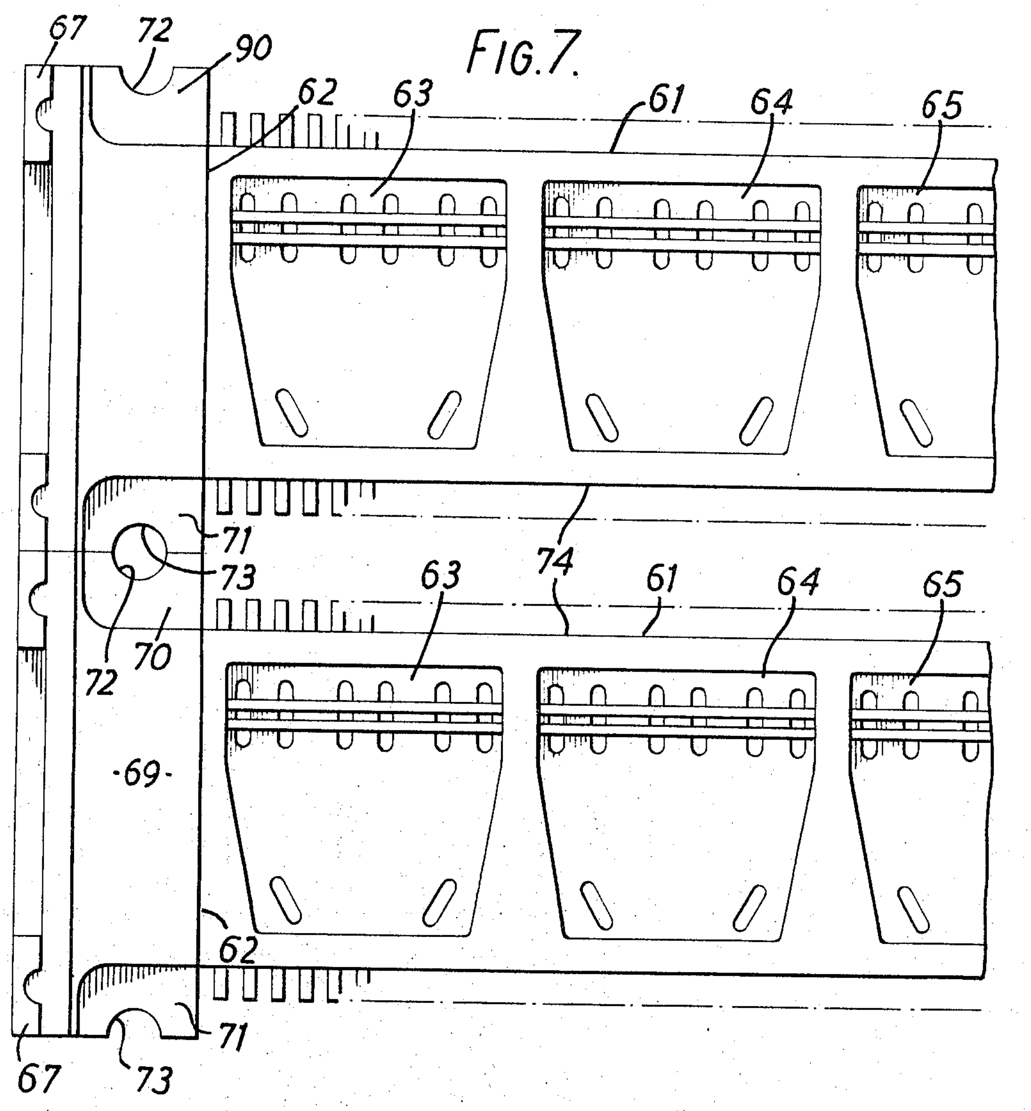
FIGS. 7 and 8 show in outline form, plan and elevation views of one end only of a multi-socket mounting strip, and illustrates how two of these strips may be arranged to accommodate, between them, a conduit member as in FIGS. 1–4.
Figure 8:
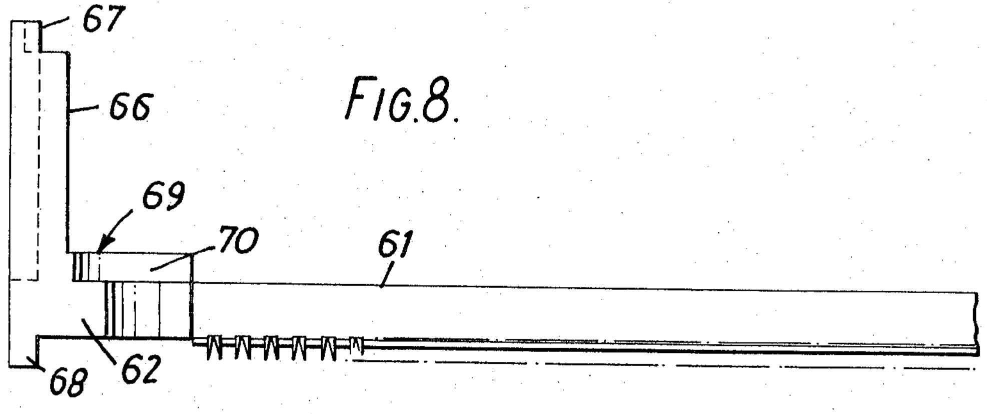

FIGS. 7 and 8 show in outline form only a multi-socket member comprising a number of socket elements each having the form and construction described above with reference to FIGS. 5 and 6. The drawing shows one end only of a preferred form of such a multi-socket member, the other end, not shown, being a mirror image of the end shown. FIG. 7 is a plan view and also illustrates how two multi-socket members of this preferred form may be assembled so as to accommodate, between them, a conduit member as described above with reference to FIGS. 1–4. FIG. 8 is an outline elevation of the multi-socket element. Referring to FIG. 7, the multiway socket member is a one piece moulding of plastics material such as glass filled polycarbonate and comprises a plank like part 61 adapted to be supported at its ends by bracket like parts 62 formed integral with each end of the plank like part. The plank like part has its upper surface formed with a number of socket recesses 63, 64, 65, etc., the recesses being regularly spaced apart and each having the form and being provided with terminal pin apertures exactly as shown and described above with reference to FIG. 5. In one contemplated embodiment the plank like part is formed to accommodate seven socket recesses into respective ones of which seven multi-contact relays can be inserted in the manner previously described. The under face of the plank like part carries inlaid conductor sets, each of which is of the form described above with reference to FIG. 6 and each of which corresponds to a respective one of the socket recesses formed in its upper surface. The spacing of the sockets along the length of the plank like part is such that the protruding groups of edge tags, 56 and 57 (FIG. 6) present a continuous row of uniformly spaced edge tags (not shown in FIG. 8) which depend from the longitudinal edges of the plank like part.

The supporting bracket like parts 62 of a multi-socket member are generally L shaped and extend transversely beyond the ends of the plank like parts, on eah side, by an amount equal to half the width of the conduit member shown in FIGS. 1–3 above. The vertical limb 66 of the bracket has tongues 67 and 68 (FIG. 8) which extend along the upper and lower rear edges of the vertical limb and which serve to engage correspondingly positioned grooves which extend along the inwardly facing side members of an apparatus mounting frame, as described more fully below with reference to FIGS. 15 and 16 of the drawings. The horizontal limb 69 of the bracket has a thickness which exceeds that of the plank like part by an amount equal to the thickness of the conduit platform part 1 (FIG. 2) the level of the upper surface of the horizontal limb being this amount higher than the level of the upper surface of the plank like part except at the transversely extending end portions 70 and 71, where the thickness is stepped down to be the same as that of the plank like part. Also, the end portions 70 and 71 have semicircular recesses 72 and 73 formed, one in each end face and the end portions are so formed that when the end faces of the corresponding bracket like parts of two multi-socket members are butted up to one another as shown in FIG. 7, the adjoining end portions form a recess adapted to accommodate the end extremities 11, 12, of a conduit platform part, the two semicircular recesses together forming a circular bore which accommodates the boss 13 or 14, which depends from the conduit platform part. The conduit member is accordingly located in the gap 74 formed between the plank like parts 61 of the two multi-socket members and the assembly is secured by means of self-tapping clamping screws and washers (not shown) inserted from the rear of the assembly into the cores 15, 16 of the bosses 13, 14 (FIG. 2). It is proposed that in production, the multi-socket members would be equipped with their multi-contact relays as described above and the connections between the relay terminal pins and the adjoining socket conductor tags would be completed by a wave soldering operation applied to these connections only, for example by using a narrow trough like solder bath over which the multi-socket assembly is placed lengthwise, with its protruding edge tags overhanging the outer walls of the solder bath. The multi-relay unit thus produced, after being subjected to a checking and testing operation, would be placed in storage as an assembly unit for use as required.

In addition to the multi-socket relay mounting members described above, an apparatus mounting frame may also be required to accommodate miscellaneous components such as resistors, transistors, capacitors, diodes and the like which may be best mounted upon a printed circuit wiring board. Such a printed circuit board would extend lengthwise over a portion of the length of the frame and may be located at one end of, or at an intermediate position along the frame and the board would be arranged to have edge terminations of the printed wiring formed along its transverse edges. In any case, the apparatus mounting frame would be provided with a multiway printed circuit plug member at one end and adapted to engage a multiway socket (not shown) mounted within the cabinet or rack into which the apparatus mounting frame is adapted for insertion.

Figure 9:
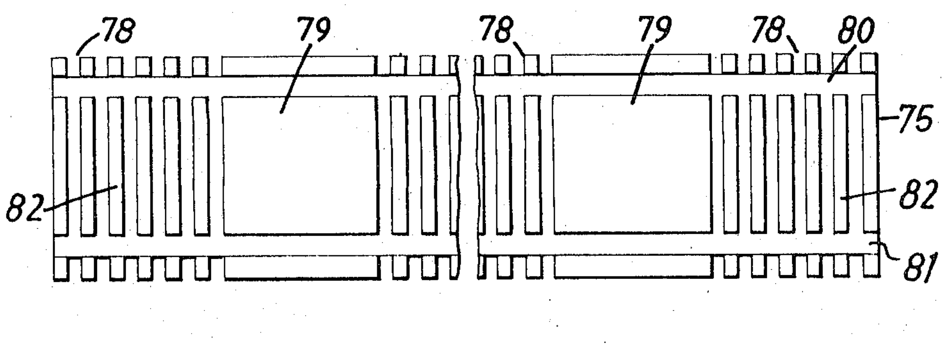
FIGS. 9, 10 and 11 show elevation, end and plan views, respectively, of an adapter element suitable for clip on attachment to the conduit member shown in FIGS. 1–4 for use in facilitating the point-to-point wiring to edge terminations on a component mounting panel or panels.
Figure 10:
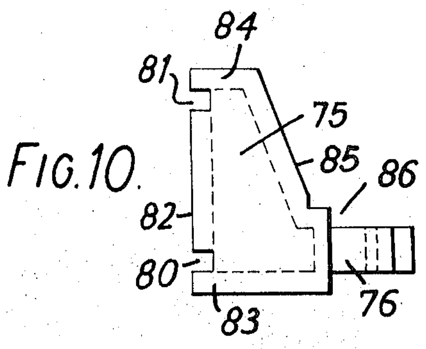
Figure 11:
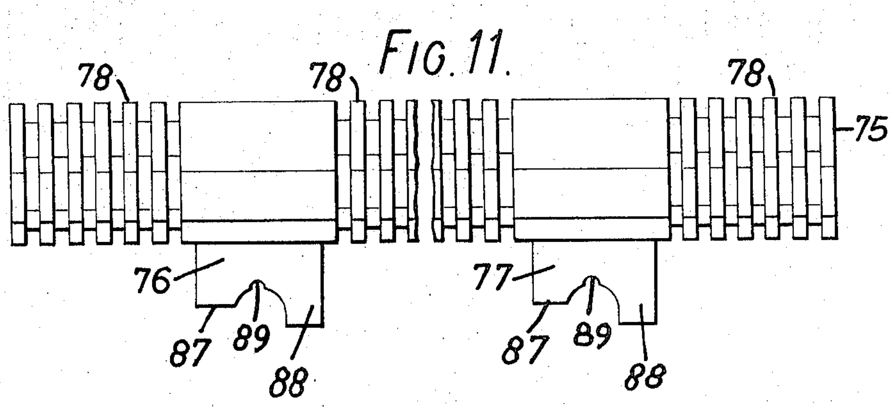

FIGS. 9, 10 and 11 of the drawings illustrate the two end portions of an adapter member designed for clip on attachment to the conduit member shown in FIGS. 1–4 of the drawings and which serves to support the transverse edge of a printed wiring panel or plug member and to facilitate the extension of point-to-point connecting wires into accurate association with the requisite edge terminations of the printed wiring carried by the printed wiring board. The adapter member 75, shown in the Figures, is a one piece moulding of plastics material such as polycarbonate. It is generally of elongate rod like form with projecting clip parts 76, 77, positioned at intervals along its length. The rod like part corresponds in length to that of the walls 4, 5, of the conduit member (FIGS. 2 and 3) and between the projecting clip parts and between these and its ends, the rod like part is formed with ribs 78 projecting from its outer surface, the spacing of the ribs being the same as that of the teeth in the lower side walls 4, 5, of the conduit member, FIG. 10 is an end view of the adapter member showing the outline form of the rod like part. FIG. 9 is a front elevation and as shown, the front face 79 has two channels 80 and 81 formed between the ends of the vertical ribs 82, which extend over the front face of the moulding and the overhanging ends of the horizontal ribs 83 and 84 which project over the upper and lower edges of the moulding. These channels are designed to be a snug fit over the edge of a printed wiring board. The lower rear face 85 has a chamfered form and is rebated at 86 to give clearance for the conduit cover part shown in FIG. 4. FIG. 11 is a plan view looking towards the lower end face in FIG. 10 and shows the plan form of the clip parts 76 and 77. Each clip is generally simicircular in form, but has one leg terminated slightly short of the transverse diameter, and the other leg 88 terminated slightly beyond the transverse diameter. The clip also has a channel 89 formed at the junction of the legs 87 and 88. The clips are spaced along the length of the rod like part so as to correspond to the spacing of the cored bosses 17 which depend from the lower face of the platform part 1 of a correspondingly shaped conduit member, and the form of the clips is such that where a conduit member is constructed to permit it two adapter members can be clipped one on each side of a conduit member as required. To assemble the adapter or adapters and conduit member together the clips on the adapter member or members are engaged with the bosses 17 through recesses 20 and pressed home until the channels 89 engage the ribs 18 formed on the bosses 17. The assembly is completed by self-tapping screws, screwed into the rear end of the cores in the bosses 17. Engagement of the clips 89 with the bosses 17 in the manner above described ensures alignment of the ribs in the adapter member with the teeth on the respective lower wall 4 or 5 of the conduit member, so that point-to-point connecting wires extended between a particular pair of teeth on the lower conduit wall can be formed to lie in the trough between the corresponding pair of ribs on the adapter member, as explained in more detail below with reference to FIG. 12.

Referring to FIG. 12, this is an explanatory diagram showing, in section, the assembly of a conduit member, as described above with reference to FIGS. 1–4 of the drawings, with a multi-socket member, as described above with reference to FIGS. 5–8 of the drawings and with an adapter member as described above with reference to FIGS. 9–11 of the drawings. The section of the conduit member is shown centrally of the assembly, with the section of the multi-socket member on the right hand side and the section of the adapter member on its left hand side. The conduit member is shown with its cover part removed and for the purpose of illustration a number of point-to-point connecting wires 90 are shown located within the conduit wiring channel 7. (Elements in this FIG. 12 are given the same reference as the corresponding elements in the separate Figures to which reference is made above). The section shown in FIG. 12 has been taken at a point between corresponding pairs of the pales forming the upper side walls of the conduit member, and shows how the wires 91 and 92 are fanned out from each side of the wiring channel 7 and formed downwardly between the corresponding pairs of teeth formed in the lower conduit wall parts 4 and 5. As previously mentioned, suitably spaced conduit members would be wired, prior to assembly with other members as in FIG. 12, and the conduit cover part would be fitted in place to enclose the connecting wires within the conduit wiring channel and to retain the fanned out ends of these wires within the troughs between the respective pairs of teeth in the lower conduit wall parts. The wires are turned over into the recesses 19, and in this way the wire ends are prevented from fouling the members on each side of the gap into which the conduit member is being inserted.

Where the wires fanned out from the left hand side of the conduit member are to be connected to respective edge terminations on a printed wiring board 93 then, the point-to-point connecting wires such as 92 and 94, extending from the troughs between the teeth on the lower conduit wall member 5, after being cut to length and their terminal ends prepared are displaced upwardly or downwardly as necessary. The adapter member is then clipped on to the conduit member in the manner previously described so that the ribs on the adapter member are aligned with the teeth on the lower conduit wall member. The printed wiring board 93, has its edge terminations arranged so that when the edge of the board is properly located within the adapter member slots 80 or 81, the edge terminations are aligned with the troughs between the ribs on the adapter member. Also edge terminations and conductors may be formed on both faces of the printed wiring board, e.g., where the board is a multiway plug board. The prepared connecting wires are now laid between their respective pairs of adapter member ribs and formed around the adapter as necessary to bring their terminal ends over the respective edge terminations on the printed wiring board, the terminal ends of the wires which have previously been displaced upwardly in preparation for the attachment of the adapter member being now formed over the upper face of the adapter to overlie the edge terminations on the upper face of the board, as shown for conductor 92 and the remaining downwardly extending wires being formed around the lower and vertical faces of the adapter member so as to overlie the edge terminations on the underface of the board, as shown for conductor 94.

For connection to the edge tags 57 presented from a multi-socket member the connecting wires such as 91 fanned out from the right hand side of the conduit member and extended through respective troughs in the lower conduit wall 4, have their projecting ends stripped of insulation and cropped to leave a prepared terminal end of suitable length. The wire ends are then turned over into the recesses 19 and the multi-socket member is butted up to the right hand face of the conduit so that the protruding edge tags 57 overlie the castellated edge of the wall 4 and bridge the recesses 19. The wire ends are then turned back to lie in the bifurcated ends **57*a* of the edge tags 57** in readiness for dip or wave soldering.

Figure 13:
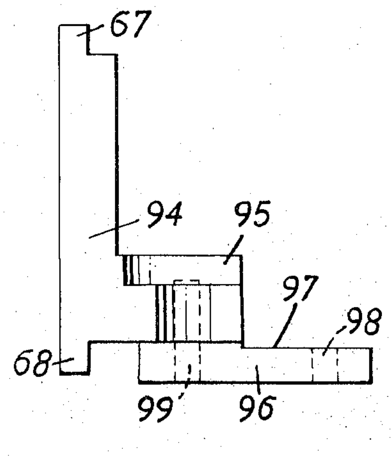
FIGS. 13 and 14 show respectively, an end view and a plan view of a spacer element for use in conjunction with the elements shown in FIGS. 1–11.
Figure 14:
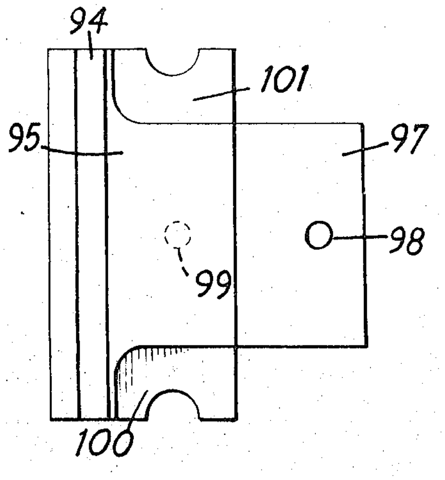

Referring now to FIGS. 13 and 14 of the drawings, the member there shown is also a single piece moulding of plastics material such as polycarbonate and serves both for spacing a conduit member relative to the rear edge of a printed circuit plug board at one end of an apparatus mounting frame, as described further below with reference to FIG. 17 of the drawings, and as a supporting member for supporting the longitudinally extending edges of a printed circuit board or the like required to be mounted at an intermediate position between the ends of the apparatus mounting frame. The member comprises a bracket like part 94 of generally similar form to the bracket like parts 62 described above with reference to FIGS. 7 and 8 but, as shown in FIGS. 13 and 14 the horizontal limb 95 of the bracket part surmounts the rear half 96 of a rectangular platform part, the front half 97 of which provides a projecting shelf part, through the center of which a screw hole 98 is formed. Another screw hole 99 extends from the center of the rear half of the under face of the platform part, part way into the thickness of the horizontal limb of the bracket part. The screw hole 98 enables a printed circuit board or the like to be secured with its longitudinal edge lying along the upper surface of the shelf part 97, while the screw hole 99 is provided for possible use should it be necessary to accommodate a printed circuit board whose width extends the full width of the apparatus mounting frame. The bracket part 94 extends beyond the platform part on each side by half the width of a conduit member and provides end portions 100 and 101 of the same form as the end portions 70 and 71 of the bracket like parts described above with reference to FIGS. 7 and 8. Thus a conduit member can be mounted between two spacer members, or between a spacer member and a multi-socket member when these are butted up to one another in the manner described above with reference to FIG. 7 of the drawings. The width of the bracket part 94 of the spacer member is designed to be that required to meet the spacing requirement described above in connection with the spacing of a conduit member relative to the rear edge of a printed circuit plug board, and in practice, when used as a supporting bracket for supporting a printed circuit board along an intermediate length of the apparatus mounting frame, only as many spacer brackets as necessary to provide the required support would be provided, the spacer brackets themselves being spaced apart, for example by the use of spacer bars, having the same cross-sectional form as the vertical limb of a spacer bracket and cut to length as required. These spacer bars may also be used as end stops, where an apparatus mounting frame is only partially equipped.

Figure 15:
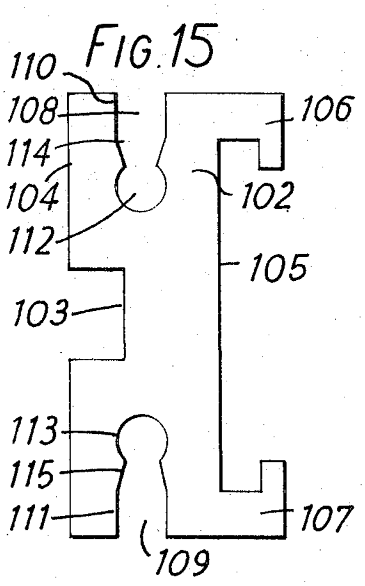
FIGS. 15 and 16 show, respectively, an end view and a plan view of an aluminium alloy extrusion which forms the longitudinal side members of a rectangular frame assembly, suitable for use with the mounting and wiring elements shown in FIGS. 1–11 and in FIGS. 13 and 14.
Figure 16:
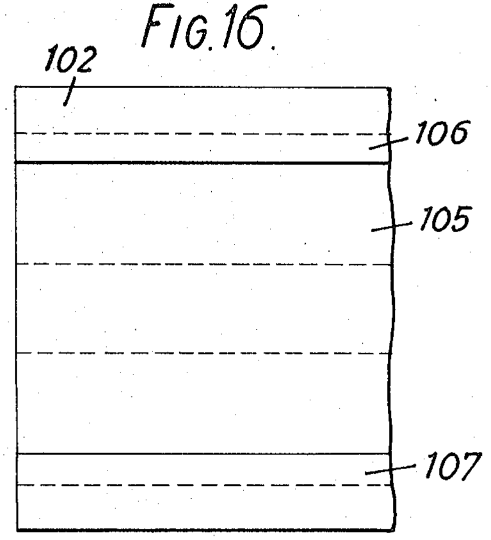

FIGS. 15 and 16 of the drawings illustrate the form of an aluminium alloy extrusion, for use in providing the longitudinal side members of a rectangular frame and which is adapted to carry the various members described above with reference to FIGS. 1–14. FIG. 15 is an end view, while FIG. 16 is an elevation view of a short length of the extruded side members. Thus an apparatus mounting frame may be constructed using two equal lengths of the extrusion shown in FIGS. 15 and 16, the two lengths being spaced apart and joined at their ends by suitable end members as described in more detail below with reference to FIGS. 17 and 18 of the drawings.

As shown in FIGS. 15 and 16, the extrusion comprises a longitudinal extending member 102, whose end view is of generally oblong form. The extrusion is used with the major axis of its end view at right angles to the plane of the frame so that the sides 104 and 105 of the extrusion face respectively outwardly and inwardly of the frame. The upper and lower faces of the extrusion are thus parallel to the minor axis of its end view. The extrusion has a slot 103 formed lengthwise of and midway across its outwardly facing side 104, while its inwardly facing side has laterally projecting, inturned flanges 106 and 107 which also extend lengthwise of the extrusion. The slots 103 in each side member are designed for sliding engagement with runner members of rectangular section (not Shown) secured to the inwardly facing sides of a rack or cabinet so as to permit the frame or frames to be mounted in a manner similar to the drawers of a filing cabinet, while the inturned flanges 106 and 107, together with the inwardly facing side 105 provide a longitudinally extending stirrup within which the vertical limbs of the bracket parts 62 and 94 (FIGS. 8 and 13) are slidably secured by engagement of the tongues 67, 68 on vertical limbs of the bracket parts with the grooves formed by the inturned flanges 106 and 107 on the extrusion. Additionally, the extrusion has longitudinally extending key hole shaped slots 108 and 109 formed into its upper and lower faces. The slots have upper portions 110 and 111 over which the side walls of the slot are parallel to one another, bottom portions 112 and 113 which have a circular form and intermediate portions 114 and 115 which have inwardly sloping side walls. These slots serve to enable the end members of a frame to be secured across the ends of the extruded side members by means of self-tapping screws, screwed into the bottom circular portion of each slot, and by means of tongues formed so as to project outwardly from washers on the self tapping screws and located so as to engage between the parallel side walls of the upper portion of each slot. It has been found that this construction results in a very rigid frame with marked resistance to buckling, as described in more detail below.

Figure 17:
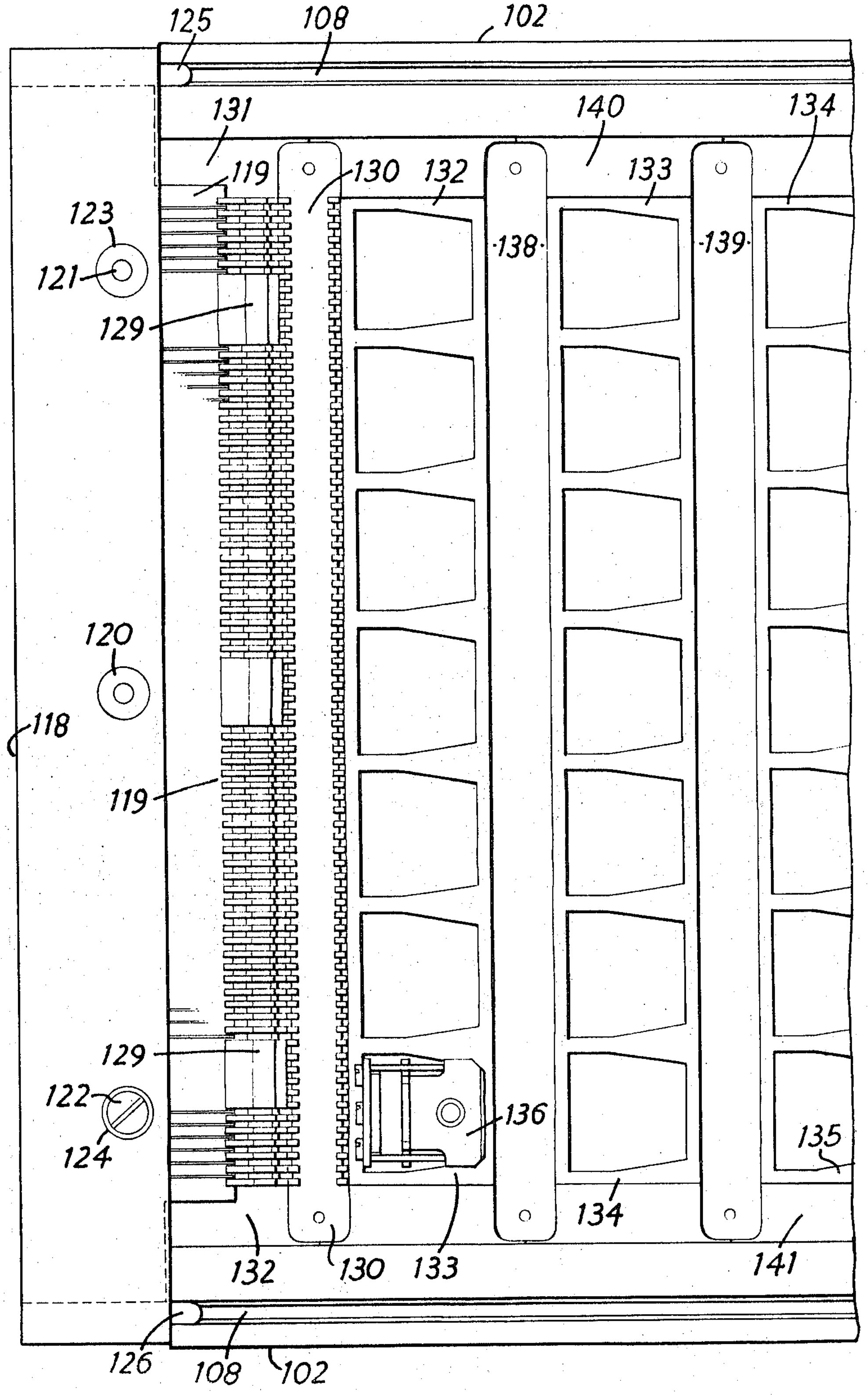
FIG. 17 shows in plan view, and on a smaller scale, one end of a typical mounting frame assembly employing the elements shown in FIGS. 1–16.
Figure 18:
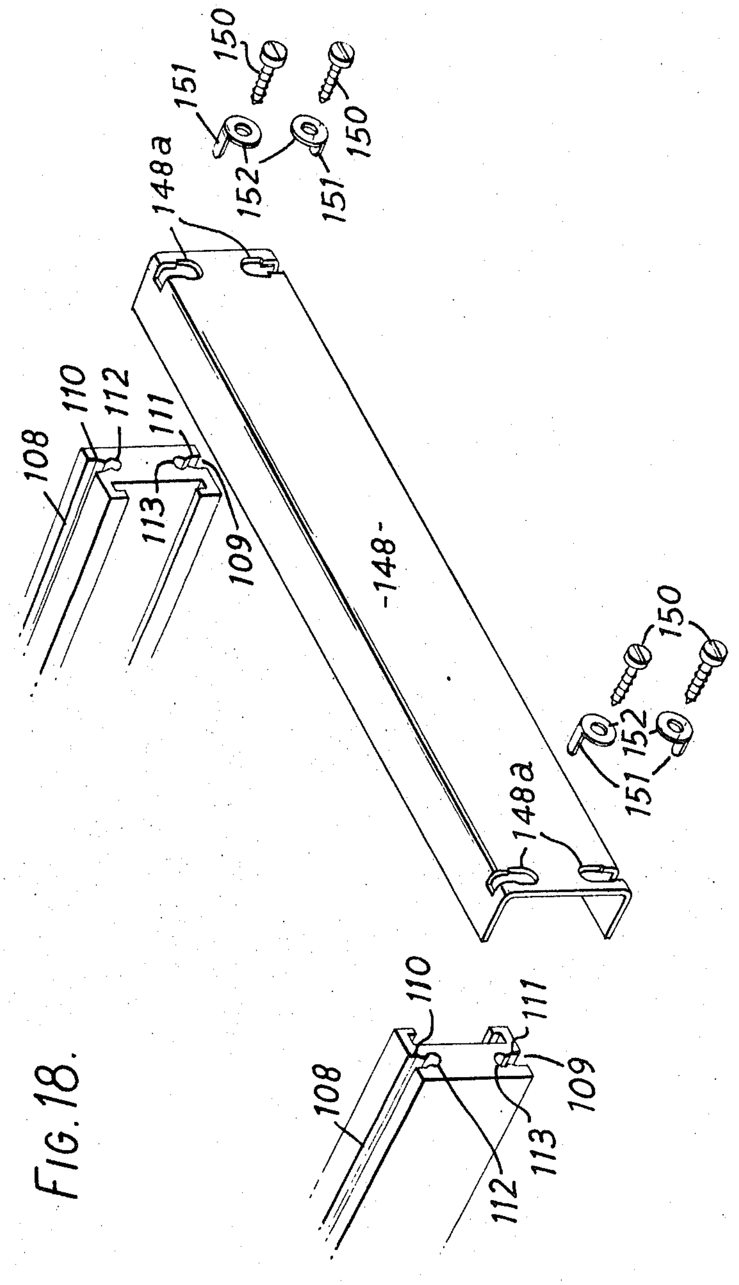
FIG. 18 is an exploded perspective view of the front end of the frame shown in FIG. 17, indicating in more detail the connection between the frame members.

FIG. 17 of the drawings shows, in plan view only, the rear end of a proposed form of apparatus mounting frame as described above with reference to FIGS. 15 and 16 of the drawings and illustrates the proposed method of mounting and wiring apparatus within the frame using the various members described above with reference to FIGS. 1–14 of the drawings. As shown, the frame comprises side members 102, and transverse end members 118 and 148 (FIG. 18). Each of the side members 102 has the form described above with reference to FIG. 15 of the drawings, while the end member 118 comprises two U-shaped struts formed from heavy gauge sheet steel material mounted alongside one another and with the base of the U in contact with the end faces of the extruded side members. The member 148 comprises a single U-shaped strut - see FIG. 18. The facing legs of the U-shaped struts of member 118 are approximately half the length of the outer legs and the overall width of each strut is somewhat less than half the height of the side member extrusions. For the end member shown in FIG. 17, a printed circuit plug board, together with suitable insulating strips, are clamped between the facing legs of the two U-shaped struts, so that the edge terminations which make contact with the plug socket (not shown) lie between and are protected by the outer legs of the U-shaped struts, while the opposite edge terminations on the plug board, to which the point-to-point wiring is terminated, project from between the rear faces of the U-shaped struts as indicated at 119. For this purpose, the U-shaped struts are drilled to provide a centrally positioned hole 110 by means of which the printed plug board can be accurately located by means of a centering pin, and to accept clamping screws 121 and 122, each U-shaped strut having access holes 123 and 124 drilled in its outwardly facing leg, while at corresponding positions in its inwardly facing leg, a screw clearance hole and a drawn and screw-threaded hole are respectively formed so that two identical U struts can be secured together in side-by-side relationship by insertion of clamping screws from opposite sides of the member. Also, elongated apertures are formed in the base of each U-shaped strut adjacent the ends thereof, these elongated apertures being formed at their lower ends to clear a self-tapping screw and at their upper ends to clear a lug which projects from the rim of a washer mounted with the self-tapping screw, so that the assembled end member can be secured across the ends of the extruded side members by engagement of the self-tapping screws (not shown) with the bottom circular portions 112, 113 of the slots 108, 109 by the lugs 125 and 126 carried by the self-tapping screw washers and which project through the base of the U-shaped struts to engage the upper portions 110, 111 of the slots 108, 109 formed in the extruded side members as described above with reference to FIG. 15 of the drawings. The inwardly facing edge of the printed circuit plug board is located in the upper of the two slots presented to it by the adapter member 129 which, in turn is secured to the conduit member 130 in the manner previously described, the spacing of the conduit member 130 with respect to the end member 118 and hence also with respect to the inwardly facing edge of the printed plug board 119, being accurately determined by spacer brackets 131 and 132 as described above with reference to FIGS. 13 and 14 of the drawings.

The end of the apparatus mounting frame shown in FIG. 17 is equipped with its multi-socket relay units 133, 134 and 135, each of which carries seven multi-contact relays of which one is shown at 136 while the remainder are indicated by diagonally crossed boxes, and between each pair of adjoining multi-socket relay units, conduit members 138 and 139 are located and secured in the manner previously described. In an embodiment of this construction, the frame may accommodate thirteen multi-socket relay units but part, at least, of this space may be used to accommodate a printed circuit board, which would be secured lengthwise of the frame to the projecting platform parts of an appropriate number of spacer members of the kind described above with reference to FIGS. 13 and 14 of the drawings, the spacer members themselves being suitably spaced apart by spacer bars of suitable length, as previously described.

The front end of the apparatus mounting frame, is shown in FIG. 18 and is of substantially the same construction as that described above for the rear end member shown in FIG. 17, except that only a single U-shaped strut 148, whose internal width equals the depth of a frame side member, is used, the gap between the legs of the U serving to accommodate the ends of members 102 and a suitable panel for the mounting of indicating lamps, test jacks and the like, as well as a suitable hand grip to enable the frame to be readily inserted into or withdrawn from a cabinet or rack. The U-shaped member 148 has in the base thereof elongated apertures 148*a*, as in the case of the struts forming the member 118, to clear self-tapping screws 150 inserted therethrough into the portions 112, 113 of slots 108, 109, and also to clear lugs 151 of washers 152, the lugs 151 projecting through the apertures 148*a* to engage in the parts 110, 111 of the slots 108, 109. As mentioned above, this construction provides a very rigid frame in spite of the simplicity of the connection. This is apparently because although only four self-tapping screws are provided to attach the member, in conjunction with the washers 150 and the lugs 151, which engage closely within the apertures 148*a* and the slots 108 and 109, eight fixed points are established which reduces the possibility of dimensional tolerances allowing play between the parts of the frame.

In practice, the apparatus mounting frame would be equipped by assembling the front and side frame members in the manner previously described and from the open rear end of the frame, the multi-socket relay units, spacer brackets and spacer bars would be assembled into the frame, in order by engaging the vertical limbs of the bracket parts with the inwardly facing stirrup parts of the extruded side members and sliding them along the frame towards the front end member of the frame. When the side member stirrups have been filled up, the conduit members, which may be prewired on a suitable jig by machine wiring means, are then located in the relevant gaps between the various members as previously described, after cropping the connecting wires to length stripping them of insulation and turning them over into the recesses 19. Any adapter members with their associated printed circuit boards are fitted during this operation. The rear end member 118 complete with the printed circuit plug board is then fitted across the rear end faces of the frame side members with the inwardly projecting edge of the plug board accurately located in the adapter member 129. With the conduit members properly located in the recesses provided for them by the horizontal limbs of the bracket like parts, the assembly is secured by self-tapping clamping screws screwed into the apertures provided for them, as described above with reference to FIGS. 5–11 and 13 and 14 of the drawings. The terminal ends of the wires which extend through the recesses 19 are then turned back into the bifurcated ends of the projecting edge tags from the multi-socket relay units, and these connections are then soldered by a wave soldering operation. Connections to the rear plug board and the like are now completed by a suitable manual soldering operation. The apparatus mounting frame thus fully equipped and wired is now ready for testing.

What is claimed is:

1. An assembly of electrical components comprising a generally rectangular frame designed for insertion, in drawer-like fashion, into a filing facility, said frame defining two generally parallel longitudinally extending bearers, a plurality of mounting strips which at their opposite ends are slidably insertable into and held in place on said bearers respectively and extend transversely between said bearers in parallel spaced apart relation, each mounting strip carrying a row of electrical components spaced along its length and having, at each of two opposite edges spaced apart in a plane generally parallel to the plane containing said bearers, a row of terminals connected to said components, and there being provided between and carried by each adjacent pair of mounting strips a conduit member defining a channel or passage for connecting wires, said passage extending between said bearers substantially parallel to said mounting strips and having adjacent each of said mounting strips a row of regularly spaced locating means for the ends of connecting wires, the terminals of said mounting strips being correspondingly positioned to register with said locating means of the conduit member.

2. An assembly as claimed in claim 1, in which portions of the adjacent mounting strips abut together at the ends secured to said bearers, the abutting portions defining a mounting for engagement by a correspondingly shaped portion of the intermediate conduit member, and the interengagement of the conduit member and the mounting strips serving to position the said locating means of the former in register with the terminals of the latter.

3. An assembly as claimed in claim 1 in which the said locating means of each conduit member comprise rows of outlets in the form of vertical slots extending through each of two opposite walls of the conduit member defining said channel or passage, and, in the exterior of said walls, adjacent said rows of outlets, a correspondingly arranged regularly spaced series of recesses extending generally perpendicular to the plane containing said bearers, the arrangement being such that the ends of connecting wires issuing from said outlets extend along said recesses and into engagement with corresponding terminals of said mounting strips.

4. An assembly as claimed in claim 3, in which the body of each conduit member comprises an open-topped channel member, the interior of the channel defining the passage for the connecting wires, the base of the channel being adapted at each end of the member to be secured to the adjacent mounting strips, and the vertical slots extending through each of the side walls of the channel are formed by a fence of uniformly spaced pales which are integral with and extend from the base of the channel.

5. An assembly as claimed in claim 4, in which each channel member forming a conduit member is of generally H-shaped cross-section with the upper limbs of the H being of greater length and comprising the slotted side walls defining between them the passage for wires and the lower limbs of the H being of shorter length and having in their outer surfaces the said recesses for receiving the ends of connecting wires, and in which the open top of each channel member, or at least some of said channel members, is closed by means of a lid of U-shaped channel section overlying the top and side walls of the channel member, the lid serving to retain within said slots of the channel member connecting wires issuing from the channel member through the vertical slots extending through said walls.

6. An assembly as claimed in claim 1, further including, in addition to components mounted on said mounting strips, components mounted on one or more circuit boards, there being provided for each circuit board one or more adapter members arranged to receive and locate the edge of a circuit board and to be secured to a conduit member for proper alignment therewith.

7. An assembly as claimed in claim 6, in which at least one H-shaped conduit member is provided with mounting bosses on the underside of the crosspiece of the H, and the lower limbs of the H are recessed in the region of the mounting bosses so that laterally extending tongues of an adapter member can pass through the recesses to engage the mounting bosses, said tongues and said mounting bosses having indexing means for insuring said alignment of said adapter member with said conduit member.

8. An assembly as claimed in claim 7, in which the or each adapter member has a slot for locating the circuit board with its plane parallel to the plane of the bearer members and an edge parallel to the conduit member, and has transverse surface grooves in which connecting wires can be led from the outlets of the conduit member to corresponding terminals at the edge of the circuit board, the mounting tongues of the adapter member and the mounting bosses of the conduit member cooperating to locate the grooves in register with said outlets.

9. An assembly as claimed in claim 8, in which in place of a mounting strip on the side of a conduit member at which a circuit board is located, there are provided on said bearer brackets which are slidably insertable into and held in place by said bearers, said brackets having a configuration similar to the ends of a mounting strip in order by abutment with an adjacent mounting strip to provide a mounting as specified for engagement by a conduit member.

10. An assembly as claimed in claim 9, in which the said bearers are of C-shaped channel cross-section, and the ends of said mounting strips together with said brackets and any associated spacers are of T-shaped cross-section so that the crosspiece of the T can make sliding engagement with the C-shaped channel.

11. An assembly as claimed in claim 1, in which the said frame is of generally rectangular configuration comprising said two bearers secured together at their ends by means of crosspieces, each of said bearers comprising an extruded section having, at each of two opposite longitudinal edges spaced apart in a direction at right angles to the plane of the frame, a longitudinal slot of generally keyhole shaped cross-section, and the said cross-pieces being secured at the ends of said bearers by means of self-tapping screws inserted longitudinally into said bearers and engaging in the rounded head portion of the keyhole slot, the self-tapping screws being provided with washers each having at its outer periphery a bent over lug engaging in the elongated part of the keyhole slot through an aperture in the corresponding crosspiece.

12. An assembly as claimed in claim 3, in which the said recesses in each conduit member extend to castellated edges of the conduit member, the further recesses defined at said edges by the castellations forming continuations of the first recesses, and the said terminals of the mounting strips comprise portions extending parallel to the plane containing said bearers and overlying the said further recesses, the arrangement being such that the connecting wires extending along said first recesses are turned over into said further recesses to pass below said terminals and are then turned back so that their free ends engage said terminals.

13. An assembly as claimed in claim 12, in which the free ends of said terminals have bifurcated prongs for engaging and locating the ends of said connecting wires.

14. An assembly as claimed in claim 4, in which there is provided within each end of said conduit member a post extending upwardly from and inclined with respect to the base of said channel in a direction towards the open end of the channel, the arrangement being such that the wires passing between the vertical pales in the regions of the ends of the conduit member are looped around said post to retain them at the base of the channel.

* * * * *